US006262849B1

(12) United States Patent
Potin et al.

(10) Patent No.: US 6,262,849 B1
(45) Date of Patent: Jul. 17, 2001

(54) OPTICAL DEVICE FOR HELMET VISOR COMPRISING A MANGIN MIRROR

(75) Inventors: Laurent Potin; Laurent Bignolles, both of Bordeaux (FR)

(73) Assignee: Sextant Avionique, Velizy Villacoublay (FR)

( * ) Notice: Subject to any disclaimer, the term of this patent is extended or adjusted under 35 U.S.C. 154(b) by 0 days.

(21) Appl. No.: 09/509,538

(22) PCT Filed: Oct. 8, 1998

(86) PCT No.: PCT/FR98/02157

§ 371 Date: Apr. 10, 2000

§ 102(e) Date: Apr. 10, 2000

(87) PCT Pub. No.: WO99/19757

PCT Pub. Date: Apr. 22, 1999

(30) Foreign Application Priority Data

Oct. 10, 1997 (FR) .................................................. 97 12681

(51) Int. Cl.⁷ ............................ G02B 27/14; G02B 27/12
(52) U.S. Cl. ............................ 359/631; 359/637; 359/639
(58) Field of Search .................................. 359/630, 631, 359/637, 633, 639

(56) References Cited

U.S. PATENT DOCUMENTS 4,026,641 * 5/1977 Bosserman et al. ................. 359/869
4,729,634 * 3/1988 Raber .................................. 89/41.01
5,073,016 * 12/1991 Burke .................................. 359/727

FOREIGN PATENT DOCUMENTS

0531121 A2 * 10/1993 (EP) .
2187911 * 9/1987 (GB) .

* cited by examiner

*Primary Examiner*—Ricky Mack
(74) *Attorney, Agent, or Firm*—Oblon, Spivak, McClelland, Maier & Neustadt, P.C.

(57) ABSTRACT

An optical device for a system for the presentation of collimated images by a non-plane mirror, which makes it possible to present a user with an image corrected of distortion due to a non-plane mirror and exhibiting good resolution. To do this, the device includes a Mangin type mirror whose optical characteristics ensure good image quality of correction of off-centering distortion and good image sharpness. The Mangin type mirror has a reflecting surface and a layer of refracting material defining a refracting surface. One surface may be spherical, and the other aspherical. The surfaces may also be aspherical. One aspherical surface may be a paraboloid, an ellipsoid, or a torus. The refracting material can exhibit an optical index varying according to the position on the surface of the mirror. The device may be applied in particular to a system for the presentation of collimated images by a spherical mirror inclined with respect to the direction from which it is observed. The Mangin type mirror then corrects the off-centering distortion of the second kind due to this off-axis spherical mirror. The device may be applied in particular to helmet viewfinders for an aircraft pilot.

15 Claims, 3 Drawing Sheets

OPTICAL DEVICE FOR HELMET VISOR COMPRISING A MANGIN MIRROR

BACKGROUND OF THE INVENTION

1. Field of the Invention

The present invention relates to an optical device for the correction of aberrations affecting an image. In particular, a device according to the invention makes it possible to correct the distortion due to a spherical concave mirror that is inclined with respect to the direction at which this mirror is observed.

The invention can be applied especially but not exclusively to a helmet viewfinder for the pilot of a fighter aircraft or helicopter or for the operator of a training simulator.

2. Discussion of the Background

A helmet viewfinder is an image-presenting device that is integrated into a helmet. The viewfinder enables the wearer of the helmet, for example the pilot of an aircraft in flight, to observe visual information simultaneously with the view of the landscape or of the pilot's cabin, which he perceives most usually through a protective visor.

The presentation of appropriate information, for example in the form of symbols, provides piloting and navigation assistance. Thus, for armed vehicles, the presentation of a reticule provides assistance in the aiming of a weapon.

The information may also consist of an image of the landscape acquired by sensors other than the eye of the helmet wearer such as infrared image sensors or light intensifiers to complement or replace direct viewing.

Inside the helmet, an image generator comprises an imager whose screen, for example a cathode-ray tube screen or a liquid crystal screen, enables an image to be displayed.

The image is most usually conveyed by a relaying optic up to a combiner which presents the conveyed image in a state where it is superimposed on the view of the landscape.

In order that the pilot may simultaneously observe the landscape viewed directly at infinity and the image from the imager, the latter image is also focused at infinity by a collimation optic.

When the combiner is formed by a simple semi-reflective flat plate, the collimation of the image can be achieved by an optic placed between the imager and the combiner. A prior art embodiment such as this has the major drawback of requiring a collimation optic that requires far too much space in relation to the restricted field of view that is obtained.

To reduce the space requirement, a combiner with optical power has been proposed. A combiner such as this provides its user with both the collimation of the image and the superimposition of the collimated image with the view of the landscape.

The prior art has a very extensive variety of devices comprising a combiner with optical power. Of more particular interest are image-presenting systems that comprise a spherical concave mirror to collimate the image.

A concave spherical mirror achieves an average quality collimation of an image placed at a particular point in space located on the axis of the mirror and at a distance from this mirror equal to half its radius of curvature. By placing an imager at this point, the eye located on the axis of the mirror receives rays coming from the imager after they are reflected on the spherical mirror. These rays are parallel and lead to the perception, by the eye, of a collimated image. If, furthermore, the mirror is semi-reflective, it enables the same eye to observe the landscape by transparency. However, in a device such as this, the imager would have to lie on the axis of the semi-transparent spherical mirror and it would conceal the user's field of view.

To clear the user's view, the spherical mirror is inclined with respect to the normal to his/her face and the user's eye is no longer on the axis of the mirror. This arrangement has the drawback of resulting in a collimated image that is affected by optical aberrations, especially off-centring aberrations, which need to be corrected, at least partially.

The inclination of the spherical concave mirror afflicts the collimated image with distortion, known as off-centring distortion of the second kind, characterized by a convergence of the verticals and an apparent curvature of the horizontals.

In a patent filed under No. 97 09893 on Aug. 1, 1997 by the present Applicant, an aspherical mirror with an adapted shape enables a correction of the off-centring distortion of the second kind.

The particular surface of the proposed aspherical mirror enables a modification of the light rays in order to rectify the effects of the spherical concave mirror on the horizontals and verticals of the image observed and thus ensure a correction of the distortion. This correction is achieved by the introduction through the aspherical mirror, of an off-centring distortion of the second kind to compensate for the distortion of the same type due to the spherical concave collimation mirror used off-axis. The aspherical mirror has the effect of making the verticals parallel and the horizontals rectilinear in the collimated image. The image is rectified and orthoscopic but the overall shape of the mirror causes a local amplification of the aberrations, and especially of astigmatism. The correction of the distortion enabled by this invention is limited by a deterioration of the resolution of the image.

SUMMARY OF THE INVENTION

The problem is to construct a device for the presentation of images comprising an inclined non-plane collimation mirror presenting a collimated image that is satisfactory for the user, namely an image that is devoid of troublesome aberrations and has a wide field of view greater than or equal to 40 degrees. This entails obtaining a collimated image that has both high resolution and high correction of the distortion due to the inclination of the non-plane collimation mirror. For a spherical collimation mirror observed at an oblique angle with respect to the axis of the mirror, this entails correcting an off-centring distortion of the second kind. In this distortion, there is no symmetry of revolution.

This is why the invention proposes an optical device for a system for the presentation of collimated images to a user, comprising an imager, an optical axis and a non-plane mirror inclined on the optical axis, characterized in that the optical device comprises optical means to correct the distortion of the image presented to the user, which distortion is due to the inclination of the non-plane mirror, the said means comprising a Mangin mirror inclined on the optical axis.

The system for the presentation of images comprises an imager and a collimation mirror that sends a substantially collimated image, in the form of a beam of parallel light rays, back to the user. The invention is most especially applicable to a spherical collimation mirror that is inclined with respect to the direction of the collimated rays.

The light rays coming from the centre of the imager form the central field of the imager. The optical axis of the device corresponds to the path of the ray of the central field that goes through the centre of the user's pupil.

The optical axis is most usually a jagged line. For example, if the image is presented to the user straight ahead of him/her, the part of the optical axis located between the eye and the spherical mirror is supported by a first straight line normal to the centre of the user's pupil, the optical axis has a break at the intersection of this first straight line with the inclined spherical mirror and the image that the spherical mirror gives of this first straight line supports the following segment of the optical axis.

According to the invention, a Mangin type mirror is placed between the spherical mirror and the imager. A mirror such as this has a concave reflecting surface and a layer of refracting material. The light rays that come from the imager and are directed towards the spherical mirror pass first of all through the refracting material and are then reflected on the reflecting surface before passing through the refracting material for a second time. A Mangin type mirror has a different optical power on the one hand in the plane of incidence of the optical axis and, on the other hand, in a perpendicular plane.

According to the invention, this mirror is inclined with respect to the optical axis.

The thickness of the refracting material may vary on the surface of the mirror.

The characteristics of thickness and of optical index of the refracting material enable compensation for the deterioration of resolution introduced by the reflecting surface correcting the off-centring distortion of the second kind.

Various surfaces may be used to make a mirror according to the invention. The choice of the surfaces depends on the distortion to be compensated for.

The Mangin type mirror may comprise an aspherical reflecting surface and a spherical refracting surface. The aspherical surface is preferably a simple surface of revolution. It may be a torus or it may be a surface generated by a parabola or an ellipse.

The Mangin type mirror may conversely comprise a spherical reflecting surface and an aspherical refracting surface. The image observed is in this case less sensitive to the constructional imperfections of the mirror.

A mirror according to the invention may even have two aspherical surfaces. It is then more costly but makes it possible to obtain a correction that is better overall.

A mirror according to the invention may also have a refracting material whose index varies with the position on the mirror surface.

The image of pupil of the eye by the spherical off-axis mirror is the first pupil image of the device. It is inclined with respect to the optical axis. From this first inclined pupil image, the Mangin type mirror according to the invention gives a second pupil image that is rectified on the optical axis.

The device also has a power unit placed between the spherical mirror and the Mangin type mirror.

The invention makes it possible to preserve an image of high resolution while at the same time providing for thorough correction of the distortion due to the inclined collimation mirror. The invention has the advantage of correcting the distortion of the image presented to the user's eye for a wide instrument pupil, for example with a diameter of at least 15 millimeters, and for a wide field that is typically greater than 40 degrees. The instrument pupil is the zone of space in which the user of an instrument must place the pupil of his/her eye in order to use it.

Whereas the invention is presented in a plane, it is always possible, after the theoretical positioning of the various optical elements of the invention, to add one or more plane mirrors that introduce no aberration but can be used to meet space requirement constraints for example so that the device may be adapted to the contour of the user's head.

The invention can be integrated into a helmet viewfinder having a wide instrument pupil and a wide field.

BRIEF DESCRIPTION OF THE DRAWING

Other features and advantages of the invention shall appear from reading the following detailed description of particular embodiments made with reference to the following appended drawings in which the optical diagrams are shown in a plane known as the plane of symmetry of the optic.

DESCRIPTION OF THE PREFERRED EMBODIMENTS

Figure 1:
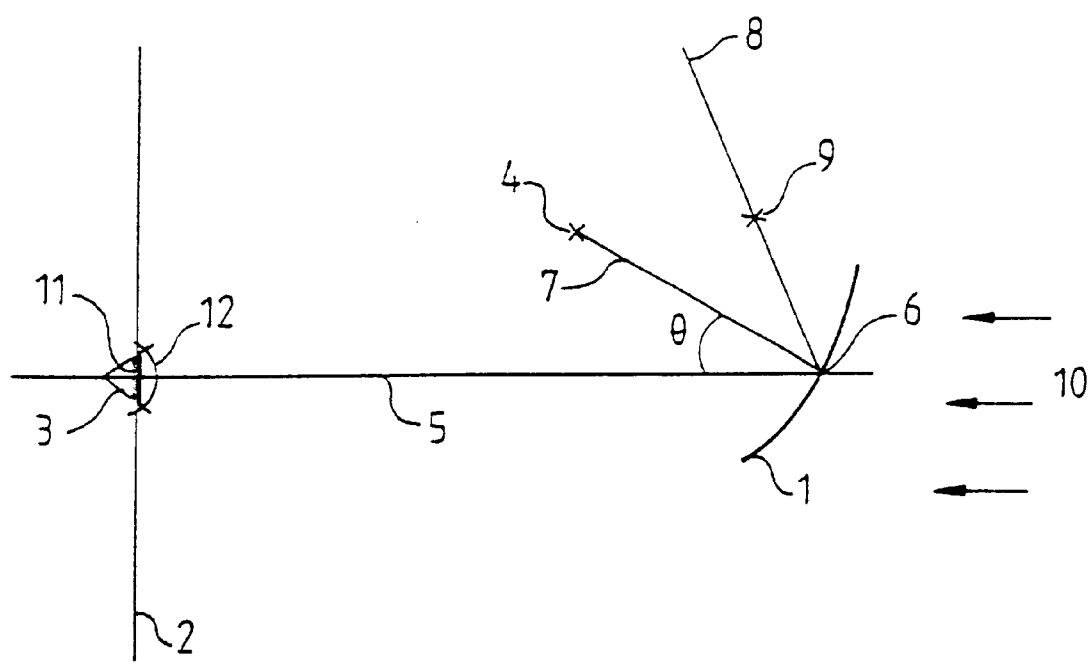
FIG. 1 shows schematically and partially an optical device with an off-optical axis spherical combiner mirror.

In FIG. 1, a user of an optical device comprising a spherical mirror 1 is represented by the plane of the pupils 2 and the straight line 5 normal to this plane 2. The pupil 11 of the eye is generally located, optically, three millimeters behind the cornea 12 of the eye 3.

It is noted that, depending on its orientation with respect to the user's face, the straight line 5 may correspond to the user's view straight ahead or else to an upward or downward view, a view towards one side or the opposite side.

The spherical mirror 1 is placed in front of the user. Its concavity is turned towards the user, and the surface of this mirror is in the vicinity of its point of intersection 6 with the straight line 5.

The spherical mirror 1 is supported by a sphere S whose centre 4 does not belong to this straight line 5. The plane P of FIG. 1 is a plane of the space that contains the centre of the supporting sphere of the spherical mirror 1 and the straight line 5 passing through the centre of the pupil 11 of the eye 3. It is the plane of incidence of the straight line 5 on the spherical mirror 1, and it is called the plane of symmetry of the optic. Most usually, this plane is the same as the plane passing through the centre of the pupil 11 and is parallel to the theoretical plane of symmetry of the user's face.

The straight line 5 and the radius 7 of the sphere S passing through the point of intersection 6 deviate from each other by an angle θ. A non-zero value of this angle θ characterizes an off-axis use of the spherical mirror 1. The spherical mirror 1 itself is said to be "off-axis", and it is inclined.

Consider an optical ray 8 which is symmetrical with the straight line 5 of the optical axis with respect to the radius 7 of the sphere S. As a first approximation, an image whose centre 9 is placed at a distance equal to half of the radius of curvature of the sphere S on this optical ray is perceived by the user's eye 3 as collimated to first order since the light rays coming from the image thus placed are reflected by the spherical mirror 1 towards the eye 3 in the form of a beam of substantially parallel rays. The image with centre 9 may have field curvature.

However, the collimation by reflection on the spherical mirror is not perfect. It is affected not only by aberrations intrinsic to this mirror but also by an off-centring optical aberration due to the off-axis use of the spherical mirror 1.

Various optical elements will be described so that the user's eye can be made to perceive a high-quality collimated image, from a light image provided by an imager and collimated by an inclined non-plane mirror. A simple example of an inclined non-plane mirror effecting collimation is an inclined spherical mirror.

The spherical mirror 1 may be semi-transparent. In this case, light rays 10 coming from the environment external to the spherical mirror 1, namely striking the convex face of this mirror, are transmitted to the eye 3 by the spherical mirror 1. This spherical mirror 1 then affords a combiner which superimposes a collimated image on the direct view of the environment.

The central field is defined as the beam of light rays coming from the centre 9 of the image to be collimated. A particular light ray is considered which belongs to the central field and passes through the centre of the user's pupil. The path of this light ray is the optical axis of the device used. The optical axis is generally a jagged line. The straight line 5 supports part of the optical axis. Most usually, the image is presented straight ahead of the user. The straight line 5 is then substantially normal to the user's face but the image may be for example presented at the top of the user's resting field of vision at infinity and the straight line 5 is then oriented in the corresponding direction.

Figure 2:
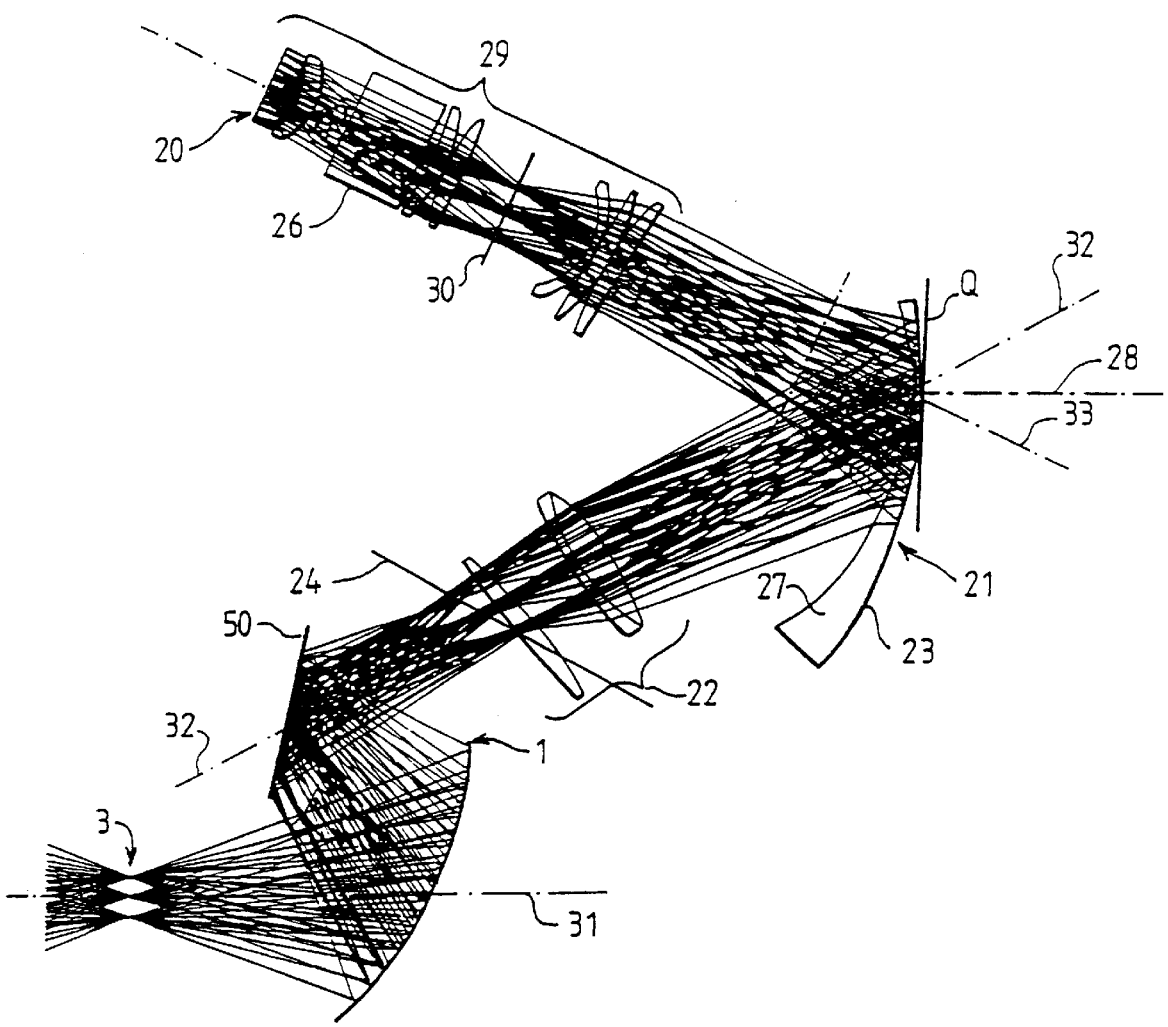
FIG. 2 shows a device according to the invention whose Mangin type mirror has a reflecting torus and a refracting sphere.

In FIG. 2, paths of light rays within an embodiment of a device according to the invention are shown.

In this embodiment, the imager, which is not shown, comprises a screen, for example the screen of a cathode-ray tube or a liquid crystal screen. The screen may also be formed, for example, by a section of a bundle of optical fibres or a slide or the screen of a light intensifier tube. An image having any surface is displayed on the screen of the imager represented by its tangent plane 20. The image may be spherical. It may equally well be plane. The path of the light rays from the screen of the imager up to the user's eye 3 are plotted for this embodiment of the invention.

The device comprises an off-axis spherical mirror 1. The device furthermore comprises a Mangin type concave mirror 21.

The light rays coming from the screen 20 of the imager strike the Mangin type mirror 21. A mirror such as this has a concave reflecting surface 23 and a layer of refracting material 27. The light rays coming from the imager pass first of all through the refracting material and are then reflected on the reflecting surface before passing through the refracting material a second time.

The light rays reflected by the Mangin type mirror 21 pass through a power unit 22 before striking the off-axis spherical mirror 1 which provides for a collimation of the image received by the user's eye 3.

It is now possible to observe the path of the light rays in the other direction, namely starting from the user's eye 3 and backtracking through the different optical elements towards the screen of the display unit.

The rays coming from the eye are reflected on the off-axis spherical mirror 1. The optical axis which, in the example of FIG. 2, is horizontal on a first part 31 between the centre of the pupil of the eye 3 and the spherical mirror 1 is also reflected on the spherical mirror 1.

This part 31 of the optical axis and its reflection on the spherical mirror 1 define a plane known as the plane of incidence P of the optical axis on the off-axis spherical mirror 1.

In the example of FIG. 2, the plane of incidence is the same as the plane P of symmetry of the optic which is represented by the plane of FIG. 2. The plane of symmetry of the optic is a plane containing the path described by the optical axis between the imager and the user's pupil. However, an embodiment of the invention is not limited to an optic in this plane P; in the context of the invention, it is always possible to add additional plane mirrors making it possible to take optical elements outside the plane P. Indeed, the plane mirrors, which are also called folding mirrors, do not modify the optical function, they do not introduce and do not correct any aberration but they enable the optical rays to circumvent obstacles such as the user's head.

The reflected rays strike, in this exemplary embodiment, a plane mirror 50 that enables the folding of the optical rays while preserving the plane of incidence of the optical axis on the spherical mirror 1. The invention may be embodied without this plane mirror 50. After reflection on the plane mirror 50, the optical axis is oriented along a straight line 32 of the plane of incidence.

On this second part 32 of the optical axis may be observed a first pupil image 24 that is the image of the pupil of the eye 3 given by the off-axis spherical mirror 1.

The normal 25 to the plane tangential to this first pupil image 24 is not parallel to the corresponding section 32 of the optical axis. The first pupil image 24 is inclined on the optical axis.

A power unit 22 is placed for example so that the first pupil image 24 is in the path of the light rays between the spherical mirror 1 and the power unit 22.

The first pupil image 24 is on one side of the power unit 22 and the Mangin type mirror 21 is on the other side. The Mangin type concave mirror 21 is in the path of the rays that come from the pupil of the eye 3—since the description as given herein backtracks along the real path of the light rays coming from the screen of the imager—and to reflect [sic] these rays towards the screen 20 of the imager. The plane P of FIG. 2 is also the plane of incidence of the optical axis on the Mangin type mirror 21.

On emerging from the mirror 21 and heading towards the screen of the imager 20, the optical axis is aligned with a straight line 33 that represents a third part of the optical axis.

The useful part of the Mangin type mirror 21 has a tangent plane Q whose normal 28, belonging to the plane of incidence P, is not parallel to the third part 33 of the optical axis. The Mangin type mirror 21 is inclined with respect to the optical axis. It is said to be off-axis.

A Mangin mirror is a meniscus having a reflecting surface and a refracting surface.

In this first embodiment of the invention, the Mangin type mirror has a simple structure close to that of a Mangin mirror. Its refracting surface, supported by a sphere, can easily be made of optical glass with a constant index. Its reflecting surface is an aspherical surface having a symmetry of revolution in order to facilitate the making of the Mangin type optical element and limit the cost of its manufacture.

This surface is for example the surface generated by the rotational motion of an arc of a circle belonging to the plane P around an axis of revolution also belonging to the plane P. Thus, in the plane of incidence P containing the two parts 31, 32 of the optical axis that have been described, the Mangin type mirror 21 has a constant radius of curvature.

Consider a plane R perpendicular to the plane of incidence P and to the tangent plane Q. The plane R is perpendicular to the axis of revolution. In this first embodiment, the curvature of the reflecting face on the Mangin type mirror 21 is also constant in the plane R but it is different from the curvature in the plane P. This mirror 21 is a spherical-toroidal lens whose aspherical surface is treated so as to be reflecting.

The curvatures defining the spherical-toroidal lens enable fine correction of the distortion due to the spherical mirror 1 while at the same time preserving a high degree of sharpness of the collimated image.

The curvatures of the reflecting surface are used to rectify the image in order to correct the distortion.

The thickness of the Mangin type mirror is used to compensate for the astigmatism introduced by the thorough correction of the distortion by means of the reflecting aspherical surface.

In variant embodiments, the aspherical surface of this mirror 21 has a radius of curvature that is variable in the plane of incidence P. These variants, which are more difficult to make, enable correction of the distortion with a finer resolution (or a better correction of the distortion for one and the same resolution).

In one of these variants, the intersection of the aspherical surface with the plane P is a parabola. The surface may even by supported by a paraboloid of revolution.

In another variant embodiment, the intersection of the aspherical surface with the plane P is a non-degenerate ellipse (namely an ellipse whose radius of curvature is not constant).

In another variant, the aspherical surface describes a part of an ellipsoid, which may have a symmetry of revolution.

In the first embodiment of the invention shown in FIG. 2, constraints of space requirement on the entire optic lead, firstly, to the minimizing of the envelope of the beam of optical rays and, secondly, to the designing of spaces for adding folding mirrors. The entire optic may then for example match the shape of the user's skull.

The optical power of the mirror 21, chosen for this embodiment, makes it possible to limit the volume of the beam of rays coming from the imager 20 in the vicinity of the Mangin type mirror.

And the power unit 22 tends to restrict the surface area of the Mangin type mirror 21.

It is noted that when there are no constraints of space requirement, a highly efficient device in terms of resolution and correction of distortion would have a useful surface area of the mirror 21 that is greater by about 50% and a magnification factor of the pupillary conjugation of the mirror 21 that is nearly twice unity.

In the embodiment of FIG. 2, the magnification factor of the pupillary images conjugated by the Mangin type mirror is kept close to unity.

The embodiment of FIG. 2 furthermore comprises a relaying optic 29 to meet the constraints of space requirement of the optic and of the imager and to adapt the magnification of the image displayed on the screen 20 for its presentation to the user.

The relaying optic 29 is placed between the screen of the imager 20 and the Mangin type mirror 21. A sufficient run is left between the Mangin type mirror 21 and the first lens of the unit 29 to fold the system by means of a plane mirror.

The relaying optic 29 is substantially aligned with the third part 33 of the optical axis.

In this third part 33 of the optical axis, a second pupillary image 30 can be seen, located between the Mangin type mirror 21 and the imager 20.

The pupillary image 30 has a tangent plane that is substantially normal to the optical axis 33: this is a correction introduced by the aspherical mirror 21. Indeed, the first image 24 of the pupil of the eye formed by the spherical mirror 1 is inclined with respect to the local optical axis 32 and corresponds to the aberrations induced by this mirror 1. The second pupillary image 30 is rectified with respect to the optical axis 33 by the aspherical mirror 21. It is substantially perpendicular to the optical axis 33.

In FIG. 2, an optical cube 26 is placed in the relaying optic 29 to enable the mixing of the image of the screen of the imager 20 with an image of a second imager (not shown). This cube 26 makes it possible for example to superimpose an image of symbols coming from the screen 20 and an image of the night landscape coming from the screen of a light intensifier.

The first described embodiment of the invention is illustrated by FIG. 2, the Mangin type mirror 21 has a spherical refracting surface and an aspherical reflecting surface.

Figure 3:
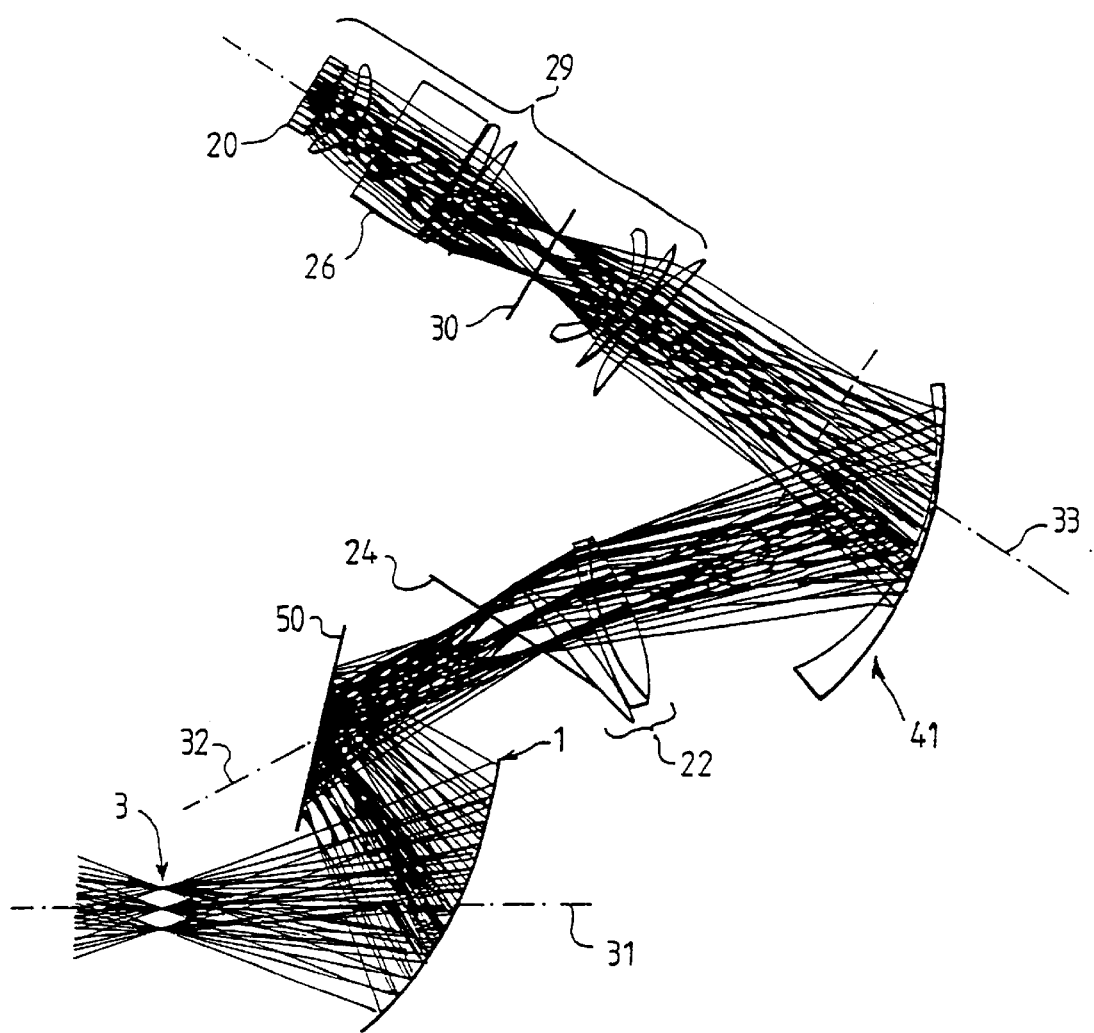
FIG. 3 shows a device according to the invention with another Mangin type mirror where a sphere is reflecting and a torus is refracting.

However, for reasons of practical embodiment, a second embodiment shown in FIG. 3 will be preferred. In this second embodiment, the Mangin type mirror 41, which is inclined on the local optical axis, has an aspherical refracting surface and a spherical reflecting surface.

Indeed, the aspherical surface is more difficult to make than the spherical surface and the imperfections of the refracting surface lead to fewer penalties than the imperfections of the reflecting surface for the Mangin type mirror.

More specifically, the refracting surface of the mirror 41 of FIG. 3 is a torus.

Alternatives of this second embodiment comprise an aspherical surface that is distinct from the torus such as for example the aspherical surfaces described in the first embodiment of the invention.

To enable a more thorough correction of the distortion with high resolution, a third embodiment comprises a Mangin type mirror whose two surfaces are aspherical.

The choice of the two surfaces enables an efficient correction of the distortion associated with high resolution (or high sharpness) of the image.

The quality of the image presented to the user, which is evaluated via its resolution and its residual distortion, is then improved at the cost of the construction of more complex surfaces for the Mangin type mirror.

A third embodiment (not shown) of the invention comprises a Mangin type mirror whose refracting material has an optical index that is variable according to the position on the surface of the mirror.

The off-axis spherical mirror 1 may be semi-transparent. In this case, the light rays emitted by the landscape or the environment in the field of view of the user are transmitted by this mirror and are received by the pupil of the eye simultaneously with the rays that are reflected by this same mirror and have been described hereinabove. The semi-transparent mirror is a combiner. It is therefore a spherical combiner used off-axis.

The combiner preferably forms part of a visor for the protection of the eyes and even the face of the user.

A visor according to the invention has at least one off-axis reflecting part. In the position of use, the visor is lowered so that the part corresponding to the collimation mirror is placed in front of the user's eye. The entire device for presenting collimated images 20, 21, 22, 1 may be integrated into a helmet for example, for an aircraft or helicopter pilot, and enables the making of a helmet viewfinder.

The viewfinder may be monocular if it presents the collimated image to one eye only.

The viewfinder may be binocular if it presents an image for each eye. It has the advantage of providing for pleasant vision when the overlapping of the fields of view of the two images is total.

A binocular viewfinder may also present a partial overlapping of the two fields of view. This makes it possible, for one and the same dimensioning of the optics, to obtain a wider field of view without causing excessive deterioration in the perception of the information presented.

The distortion of an image having a grid leads to the deformation of the grid. The images presented to the user, in which the distortion inherent to the off-axis concave visor is corrected, are particularly advantageous for a helmet viewfinder for they conform to the actual dimensions of the objects represented. This is paramount when the viewfinder presents an image superimposed on the direct view and is even more so when the image presented replaces the direct view for the user, for example in the case of night vision assisted by an image intensifier, of infrared vision or of a training simulator.

What is claimed is:

1. Optical device for a system for a presentation of collimated images through the pupil of the eye of a user, comprising:

an imager with an optical axis defined by a path of a ray passing through a centre of the pupil of the eye and a centre of the imager;

an off-axis concave mirror inclined with respect to a first part of the optical axis defined by a line between the centre of the pupil and a centre of the off-axis concave mirror; and a Mangin mirror inclined on a second part of the optical axis corresponding to a reflection of the first part of the optical axis on the concave mirror, wherein the Mangin mirror includes a refracting material configured to correct an off-axis distortion of the image presented to the user due to the off-axis concave mirror.

2. Device according to claim 1, wherein the Mangin mirror comprises:

a first reflecting surface; and a layer of the refracting material defining a second reflecting surface, wherein the thickness of the layer between the two surfaces is not constant.

3. Device according to claim 2, wherein the refracting and reflecting surfaces of the Mangin mirror are aspherical.

4. Device according to claim 2, wherein the Mangin mirror has a spherical refracting surface and an aspherical reflecting surface.

5. Device according to claim 2, wherein the Mangin mirror has an aspherical refracting surface and a spherical reflecting surface.

6. Device according to claim 3, wherein at least one aspherical surface of the Mangin mirror is a torus.

7. Device according to claim 3, wherein the Mangin mirror has two curves of intersection with a plane of incidence of the optical axis and at least one of the curves has a variable curvature.

8. Device according to claim 7, wherein the curve having a variable curvature is at least one of a parabola and an ellipse.

9. Device according to claim 3, wherein at least one aspherical surface of the Mangin mirror is supported by a paraboloid.

10. Device according to claim 3, wherein at least one aspherical surface of the Mangin mirror is supported by an ellipsoid.

11. Device according to claim 1, wherein the refracting material has an optical index that is variable with a position on a surface of the Mangin mirror.

12. Device according to claim 1, wherein the device comprises:

a power unit placed between the concave mirror and the Mangin mirror.

13. Device according to claim 1, wherein the concave mirror is spherical and inclined with respect to a direction of observation.

14. Device according to claim 1, wherein the concave mirror is semi-transparent.

15. Device according to claim 1, wherein the system for the presentation of collimated images is a helmet viewfinder.

* * * * *